Sept. 18, 1951 R. ADLER 2,568,137

DEMODULATOR

Filed March 19, 1948 2 Sheets-Sheet 1

ROBERT ADLER
*INVENTOR.*

BY Bruce L. Birchard

*HIS AGENT.*

ROBERT ADLER
INVENTOR.
BY Bruce Birchard
HIS AGENT

Patented Sept. 18, 1951 2,568,137

UNITED STATES PATENT OFFICE 2,568,137

DEMODULATOR

Robert Adler, Chicago, Ill., assignor to Zenith Radio Corporation, a corporation of Illinois Application March 19, 1948, Serial No. 15,861

7 Claims. (Cl. 250—27)

This invention relates to electrical circuits, and more particularly to such circuits as those used for limiting and demodulating frequency modulated input signals.

In my co-pending application, Serial No. 7,864, filed February 12, 1948, for Electron Discharge Devices, now U. S. Patent No. 2,511,143, issued June 13, 1950, and which application is assigned to the same assignee as the present application, there is disclosed as a preferred embodiment a novel type of electron discharge device which is particularly well adapted to use as a combination amplitude limiter and frequency demodulator in a frequency modulation radio receiver. Such preferred embodiment comprises in essence a pair of high transconductance control systems cascaded along a single electron stream, the control grid in the second system being connected to an antiresonant circuit and space charge coupled to the first. Such space charge coupling behaves phasewise as a unilateral negative capacitance. The two control systems function as beam gates, space current passing to the anode only when both gates are open (i. e., only when the control grids in both systems are simultaneously positive). The demodulator characteristic obtained by the use of a system employing a tube and circuit of this type has the desirable feature that no pronounced peaks are encountered within the frequency band covered by adjacent frequency modulation channels; this unique characteristic facilitates tuning and increases the effectiveness of the circuit in rejecting modulation carried on adjacent channels.

As is well known in the art, the responsiveness of a frequency demodulating system is dependent upon the slope of the demodulator characteristic in the neighborhood of the center frequency, while the usable frequency band is dependent upon the range over which such slope is substantially constant. In a system of the class described, this frequency range is dependent upon the quality factor or Q of the antiresonant circuit connected to the second control grid, increased range being obtainable with a decrease in quality factor. The voltage generated in such circuits by unilateral space charge coupling, however, is reduced when the quality factor is decreased, and a limit exists below which the quality factor cannot be reduced without rendering the voltage undesirably low. In practice, the minimum Q which may be safely used is determined by the minimum distributed circuit capacitance attainable.

It is an important object of the present invention to obtain in a system of the class described a broader straight portion of the demodulator curve while maintaining the voltage across the antiresonant circuit connected to the second control grid substantially unchanged.

It is a more specific object of the present invention to provide such broadening of the demodulator curve by reducing the effective Q of the antiresonant circuit connected to the second control grid while maintaining the voltage across such circuit substantially unchanged.

The features of the present invention which are believed to be novel are set forth with particularity in the appended claims. The invention, together with further objects and advantages thereof, may more readily be understood, however, by reference to the following description taken in connection with the accompanying drawings, in which like reference numerals indicate like elements, and in which:

Figure 1:
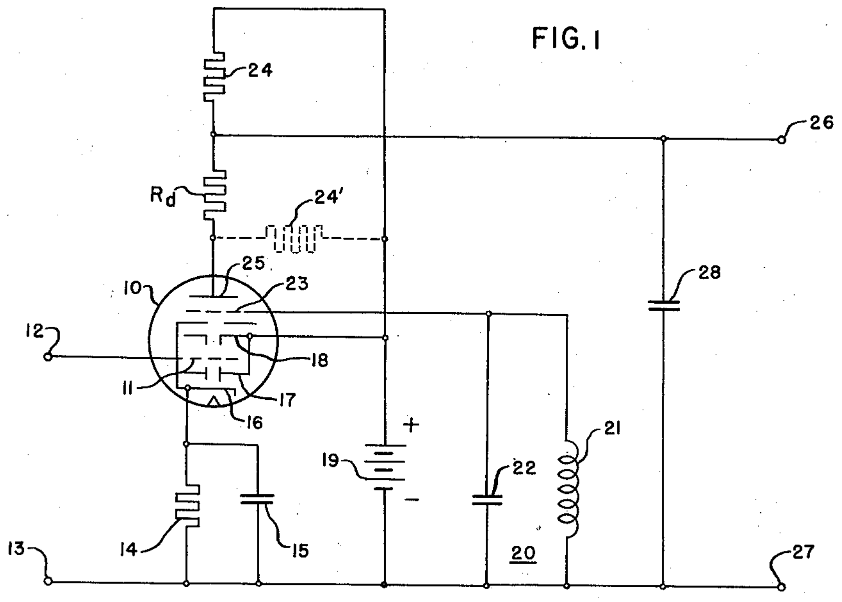
Figure 1 is a schematic circuit diagram of a present preferred embodiment of the invention.

There is shown in Figure 1, as a present preferred embodiment of the invention, a schematic circuit diagram of a combined amplitude limiter and frequency demodulator which utilizes a tube 10 constructed in accordance with my aforementioned co-pending application. Input signals are applied to the first grid 11 from the output of the customary intermediate frequency amplifier (not shown) by way of input terminals 12 and 13. Suitable unidirectional operating bias voltage is supplied by means of a cathode bias resistance 14 and its associated bypass capacitance 15 arranged in circuit with the cathode 16 in the customary manner. The accelerating electrodes 17 and 18 are interconnected, either internally or externally, and are connected to the positive terminal of a suitable source of positive unidirectional operating potential, here shown as a battery 19, the negative terminal of which source is connected to terminal 13. An oscillatory load, shown here as an antiresonant circuit 20 comprising an inductance 21 and a capacitance 22, is connected between the second grid 23 of device 10 and terminal 13. It is to be understood that capacitance 22 may comprise the distributed capacitance of the circuit, in which case no separate circuit element 22 may be necessary. Audio frequency output voltage is derived from an anode load resistance 24, connected between the anode 25 of device 10 and the positive terminal of source 19, by means of a pair of output terminals 26 and 27. Output terminals 26 and 27 are bypassed for the intermediate frequency by a capacitance 28, and output terminal 27 is connected to input terminal 13.

That portion of the circuit of Figure 1 thus far described is identical with the limiter-discriminator circuit disclosed in my aforementioned co-pending application. In operation, the antiresonant circuit 20 is tuned to resonate at the intermediate frequency. Unilateral space charge coupling exists from the input grid 11 to the quadrature grid 23; that is to say, voltage is induced on the second grid 23 by the space current passed by the first grid 11. However, the potential of the first grid 11 is unaffected by potential variation of the second grid 23. This space charge coupling between grids is equivalent phasewise to a unilateral negative capacitance; consequently, the voltage induced on the second grid 23 lags the voltage of the first grid 11 by exactly 90 degrees whenever the input voltage varies at exactly the frequency to which the antiresonant circuit 20 is tuned. Frequency deviation of the input voltage applied to grid 11 results in a change in the phase displacement between the voltages appearing on the first and second grids 11 and 23, and thus in the average anode current. As a result, the output voltage appearing across terminals 26 and 27 varies in amplitude in accordance with frequency variation of the input signal applied between terminals 12 and 13.

Figure 2:
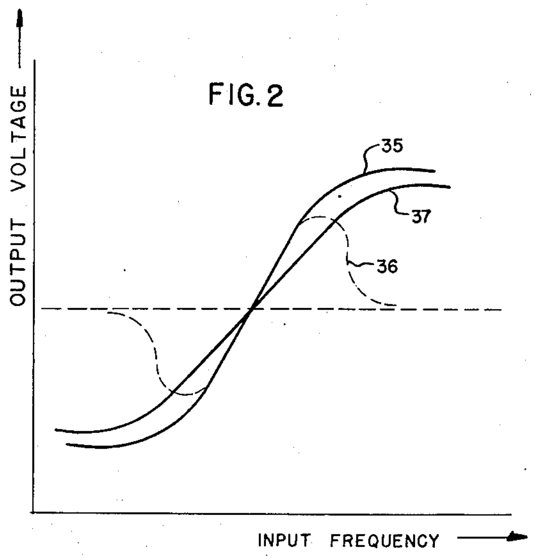
Figure 2 is a graphical representation of a characteristic of the circuit of Figure 1.

The discriminator characteristic for the circuit thus far shown and described in Figure 1 is shown in Figure 2 as curve 35. For purposes of comparison, the demodulator characteristic for the well-known combination of an amplitude limiter and a conventional double diode phase sensitive discriminator is shown as the dotted curve 36, the coordinate axes of curve 36 having been displaced.

In accordance with the present invention, in order to improve the linear range of responsiveness of the system to frequency variation of the input signal, an additional load impedance $R_d$ is serially connected between anode 25 and load resistance 24. The additional load impedance $R_d$ is made substantially resistive throughout the band of input signal frequencies, i. e., the resistive component of impedance $R_d$ is larger, throughout the band of input signal frequencies, than the reactive component of such impedance. The inclusion of additional load impedance $R_d$ in the system of Figure 1 has the effect of spreading out the discriminator characteristic, the net result being a characteristic such as that shown in Figure 2 as curve 37. It is seen that the linear portion of curve 37 includes a wider band of input signal frequencies than the linear portion of characteristic 35; in this manner, substantially linear detection over relatively large frequency deviations may be obtained.

Figure 3:
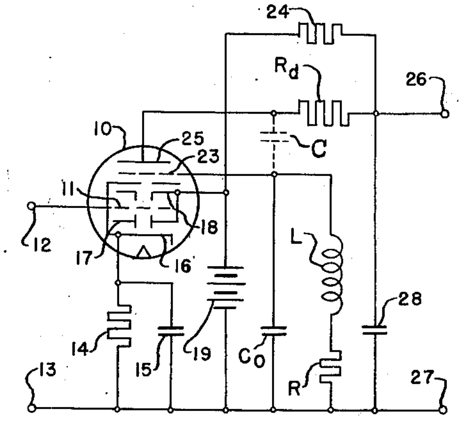
Figures 3 through 5 are equivalent circuit diagrams of the embodiment shown in Figure 1.

In order clearly to explain the manner of operation of the invention, there is shown in Figure 3 an equivalent circuit of the system shown schematically in Figure 1. Inductance element 21 is represented as comprising a pure inductance component L in series with a damping resistance R, such representation being conventional in the art. Capacitance element 22, representing the total tuning capacity, has been split, for the purpose of facilitating the analysis, into two components: namely, C, the interelectrode capacitance between the quadrature grid 23 and the anode 25, and $C_0$, the remaining capacitance from the quadrature grid 23 to terminal 13.

Figure 4:
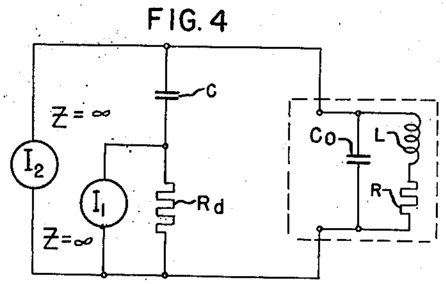

Figure 4 shows a further simplification of the equivalent circuit of Figure 3, the anode 25 being replaced by an infinite impedance source $I_1$ of anode current and the second grid 23 being replaced by an infinite impedance current source $I_2$.

Figure 5:
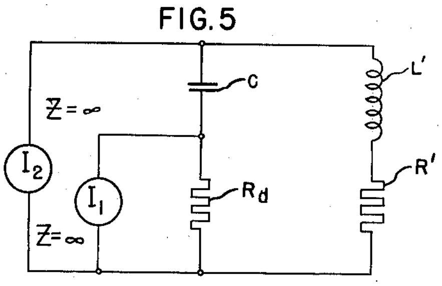

Further simplification of the equivalent circuit of Figure 4 may be effected by replacing the parallel arrangement comprising $C_0$, L and R by an equivalent circuit comprising an effective inductance L′ in series with an effective damping resistance R′, the value of the effective inductance L′ being such as to resonate at the input signal center frequency with the capacitance C. Such further modification is shown in Figure 5, the inductance L′ resonating at the input signal center frequency with capacitance C, and damping resistance R′ including the equivalent of both the original damping resistance R and any losses apearing in capacitance $C_0$. At frequencies near the input signal center frequency, the values of inductance L′ and resistance R′ may be expressed approximately as follows:

$$L'=L\left(\frac{C_0+C}{C}\right) \quad (1)$$

$$R'=R\left(\frac{C_0+C}{C}\right)^2 \quad (2)$$

From the equivalent circuit of Figure 5, it is apparent that the parallel resonant circuit comprising inductance L′, capacitance C, and damping resistances $R_d$ and R′, is series excited by the anode, represented by infinite impedance current source $I_1$, and parallel excited by the quadrature grid, represented by infinite impedance current source $I_2$. Since the current sources are both of infinite impedance, they contribute nothing to the damping of the network comprising inductance L′, capacitance C, and damping resistances $R_d$ and R′. As will be hereinafter shown, the effect of such a series-parallel feed of a parallel tuned circuit is to maintain substantially constant the voltage appearing across the inductance element L′, while the addition of $R_d$ results in a substantial decrease in the circuit Q, thereby broadening the linear portion of the demodulator characteristic.

More rigorously, the explanation of the operation of the invention is as follows. If it is assumed that the input signals are maintained at the center frequency, the current through inductance element L′ from source $I_1$ may be represented by the following equation:

$$I_{L'1}=I_1\frac{R_d}{R'+R_d} \quad (3)$$

the current being divided between the two paths represented by damping resistance $R_d$ and the series combination of capacitance C, inductance L′, and damping resistance R′ in the inverse ratio of the values of damping resistances $R_d$ and R′, since capacitance C and inductance L′ are tuned to resonate, and thus have zero series impedance, at the input signal center frequency. The voltage appearing across inductance L′ due to the component of current $I_{L'1}$ may then be represented by the equation $$(4) \quad E_{L'1}=I_{L'1}\omega L'=I_1\frac{R_d}{R'+R_d}\omega L'$$

where $\omega$ equals $2\pi f$, $f$ being the input signal center frequency.

Since the current source $I_2$ excites the network in a parallel manner, and since $\omega L'$ is in practice much greater than $R'$, the contribution of source $I_2$ to the voltage across inductance $L'$ may be represented to a very close degree of approximation by the equation $$(5) \quad E_{L'2}=I_2R_{sh}$$

where $R_{sh}$ is the effective impedance shunting source $I_2$. Since $L'$ and $C$ are tuned to resonate at the center frequency $f$, $R_{sh}$ is resistive and is defined by the relation $$(6) \quad R_{sh}=\frac{(\omega L')^2}{R_{sr}}$$

Where $R_{sr}$ is the series resistance of the circuit comprising inductance $L'$, capacitance $C$, and resistances $R_d$ and $R'$. By substitution, $$(7) \quad E_{L'2}=I_2\frac{(\omega L')^2}{R'+R_d}$$

Since there is a 180-degree phase reversal between the input grid and the anode, due to basic considerations regarding an electron tube having a control grid, and since the second, or quadrature, grid voltage lags the input grid voltage by 90 degrees, due to the space charge coupling between grids, the current $I_1$ lags current $I_2$ by 90 degrees. However, the 90-degree phase advance accompanying the passage of a current through a capacitance acts to bring the currents from sources $I_1$ and $I_2$ into phase. Consequently, the contributions from sources $I_1$ and $I_2$ to the voltage appearing across inductance $L'$ are in phase with each other and may be arithmetically added.

If, now, inductance 21 and capacitance 22 (Figure 1) are so chosen that the ratio of equivalent reactance $\omega L'$ to the equivalent resistance $R'$ (Figure 5) is equal to the ratio of the anode current to the quadrature grid current, that is, if $$(8) \quad \frac{\omega L'}{R'}=\frac{I_1}{I_2}$$

then, by combining Equations 7 and 8

$$(9) \quad E_{L'2}=I_1\frac{R'}{\omega L'}\frac{(\omega L')^2}{R'+R_d}=I_1\frac{R'}{R'+R_d}\omega L'$$

Adding Equations 4 and 9, $$(10) \quad E_{L'}=I_1\omega L'$$

from which it is seen that the total voltage $E_{L'}$ appearing across inductance $L'$, which is effectively equal to the quadrature grid voltage, is substantially independent of the amount of damping resistance $R_d$. However, the circuit Q is obviously decreased by increasing $R_d$.

Figure 6:
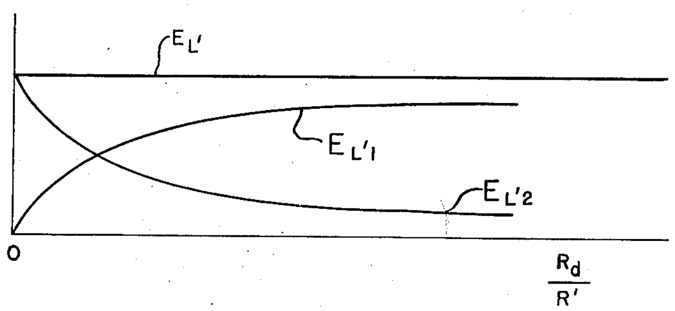
Figure 6 is a graphical representation of voltage relationships useful in explaining the operation of the invention.

Figure 6 is a graphical representation of the relations indicated by Equations 4, 7, and 10, the respective voltages being plotted as functions of the ratio of $R_d$ to $R'$. Any deviation from the condition set forth by Equation 8 results in either an increase or a decrease of the total voltage $E_{L'}$, which is substantially equal to the voltage appearing on the quadrature grid, with an increase in the ratio of $R_d$ to $R'$.

While the explanation of the operation of the present invention has been made under the assumption that the input signals are maintained at center frequency, and the analysis is rigorous only under such a condition, small deviations in input signal frequency from the center frequency, for example deviations of the order of one-half the band width of a frequency modulated radio signal, have only a very small effect on the rigor of the analysis. It may then be said that, within the band of input signal frequencies, the analysis is accurate to a very close degree of approximation.

As an alternative arrangement, the audio frequency load resistance 24 may be connected directly between the anode 25 and the positive terminal of source 19, such alternative connection being denoted by reference numeral 24' (Figure 1). Such alternative connection has no substantial effect on the operation of the invention.

Figure 7:
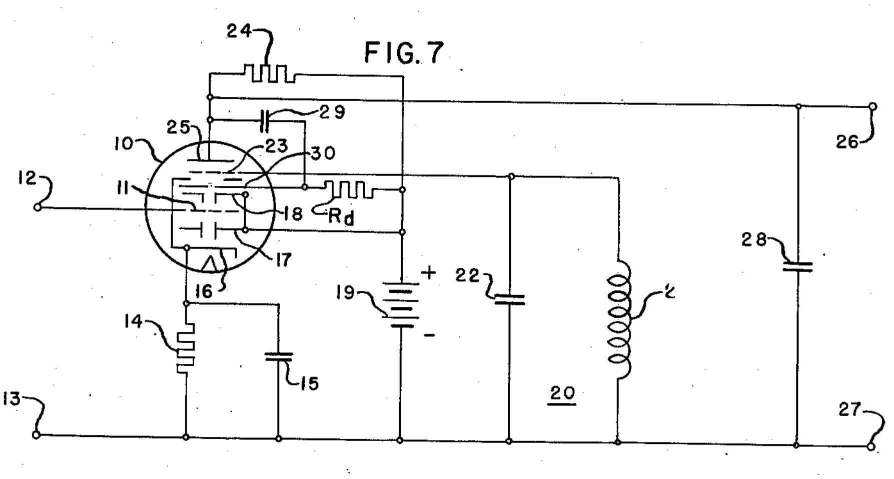
Figure 7 is a schematic circuit diagram of another embodiment of the invention.

There is shown in Figure 7 a further embodiment of the invention, the additional load impedance $R_d$ being arranged in the circuit in such manner as to pass current during both portions of the conductive half-cycle, that is, during the entire time that space current is passed by the input grid 11. In this embodiment, the second accelerating electrode 18 is followed by an auxiliary electrode 30 which is coupled to the anode 25 by coupling means having a low impedance throughout the band of input signal frequencies, such means being shown as a capacitance 29. It is to be understood that capacitance 29 may comprise, either in whole or in part, the inherent interelectrode capacitance between auxiliary anode 30 and anode 25. The additional load impedance $R_d$, which is substantially resistive throughout the band of input signal frequencies, is then added in series with the auxiliary electrode; in this manner, the space current is utilized throughout the entire half-cycle during which current is passed by the input grid 11.

It is possible, in the system shown in Figure 7, to omit the auxiliary electrode 30 and connect damping resistor $R_d$ as well as coupling means 29 to the second accelerator electrode 18. This modification operates in a manner substantially similar to the mode of operation of the system of Figure 7, but has the disadvantage of lacking the shielding effect which is normally provided by keeping the accelerator electrodes at constant potential with respect to input terminal 13.

While the present invention has been shown and described in connection with a novel type of electron discharge device such as that disclosed and claimed as a preferred embodiment in my aforementioned co-pending application, it is to be understood that the invention may be employed to advantage in systems employing conventional tubes, such as those systems disclosed and claimed in the Zakariás Patent No. 2,208,091 and the Kalmus Patent No. 2,233,706.

While there have been shown and described certain present preferred embodiments of the invention, it is to be understood that numerous variations and modifications may be made, and it is contemplated, in the appended claims, to cover all such modifications as fall within the true spirit and scope of the invention.

I claim:

1. In combination: an electron discharge device having an input electrode and an output electrode; an input circuit connected to said input electrode; an oscillatory circuit reactively coupled to said input circuit; an output load impedance coupled to said output electrode; and an additional predominantly resistive load impedance connected to said output electrode and reactively coupled to said oscillatory circuit to decrease the effective Q of said oscillatory circuit while maintaining substantially unchanged the voltage appearing across said oscillatory circuit.

2. In combination: an electron discharge device having an input electrode and an output electrode; an input circuit connected to said input electrode; an oscillatory circuit reactively coupled to said input circuit; an output load impedance coupled to said output electrode; and an additional predominantly resistive load impedance connected to said output electrode and space-charge coupled to said oscillatory circuit to decrease the effective Q of said oscillatory circuit while maintaining substantially unchanged the voltage appearing across said oscillatory circuit.

3. A system for demodulating an input signal the frequency of which varies throughout a predetermined frequency band, said system comprising: an electron discharge device having an input control grid, a second control grid space-charge coupled to said input grid at frequencies within said band, and an anode; an input circuit coupled to said input grid and adapted to have said input signal applied thereto; an oscillatory circuit coupled to said second grid and tuned to be substantially antiresonant at all frequencies within said band; an output load impedance coupled to said anode for deriving an output signal varying in amplitude in response to frequency variations of said input signal; and an additional load impedance coupled to said anode and to said oscillatory circuit to decrease the effective Q of said oscillatory circuit while maintaining substantially unchanged the voltage appearing across said oscillatory circuit.

4. A system for demodulating an input signal the frequency of which varies throughout a predetermined frequency band, said system comprising: an electron discharge device having an input control grid, a second control grid space-charge coupled to said input grid at frequencies within said band, and an anode; an input circuit coupled to said input grid and adapted to have said input signal applied thereto; an oscillatory circuit coupled to said second grid and tuned to be substantially antiresonant at all frequencies within said band; an output load impedance coupled to said anode for deriving an output signal varying in amplitude in response to frequency variations of said input signal; and an additional load impedance substantially resistive throughout said band and coupled to said anode and to said oscillatory circuit to decrease the effective Q of said oscillatory circuit while maintaining substantially unchanged the voltage appearing across said oscillatory circuit.

5. A system for limiting and demodulating an input signal the frequency of which varies throughout a predetermined frequency band, said system comprising: an electron discharge device having in the order named a cathode, an accelerating electrode, an input control grid, a second control grid space-charge coupled to said input grid at frequencies within said band, and an anode; an input circuit coupled to said input grid and adapted to have said input signal applied thereto; an oscillatory circuit coupled to said second grid and tuned to be substantially antiresonant at all frequencies within said band; an output load impedance coupled to said anode for deriving an output signal varying in amplitude in response to frequency variations of said input signal; and an additional load impedance coupled to said anode and to said oscillatory circuit to decrease the effective Q of said oscillatory circuit while maintaining substantially unchanged the voltage appearing acros ssaid oscillatory circuit.

6. A system for limiting and demodulating an input signal the frequency of which varies throughout a predetermined frequency band, said system comprising: an electron discharge device having in the order named an accelerating electrode, an input control grid, a second control grid space-charge coupled to said input grid at frequencies within said band, and an anode; an input circuit coupled to said input grid and adapted to have said input signal applied thereto; an oscillatory circuit coupled to said second grid and tuned to be substantially antiresonant at all frequencies within said band; an output load impedance coupled to said anode for deriving an output signal varying in amplitude in response to frequency variations of said input signal; and an additional load impedance substantially resistive throughout said frequency band and coupled in parallel with said output circuit and in series with said oscillatory circuit to decrease the effective Q of said oscillatory circuit while maintaining substantially unchanged the voltage appearing across said oscillatory circuit.

7. A system for limiting and demodulating an input signal the frequency of which varies throughout a predetermined frequency band, said system comprising: an electron discharge device having in the order named a cathode, an accelerating electrode, an input control grid, a second control grid space-charge coupled to said input grid at frequencies within said band, an auxiliary anode, and an anode; an input circuit coupled to said input grid and adapted to have said input signal applied thereto; an oscillatory circuit coupled to said second grid and tuned to be substantially antiresonant at all frequencies within said band; an output load impedance coupled to said anode for deriving an output signal varying in amplitude in response to frequency variations of said input signal; and an additional load impedance substantially resistive throughout said frequency band and coupled to said auxiliary anode and to said oscillatory circuit to decrease the effective Q of said oscillatory circuit while maintaining substantially unchanged the voltage appearing across said oscillatory circuit.

ROBERT ADLER.

REFERENCES CITED

The following references are of record in the file of this patent:

UNITED STATES PATENTS

| Number | Name | Date |
|---|---|---|
| 2,153,269 | Nicoll | Apr. 4, 1939 |
| 2,190,515 | Hann | Feb. 13, 1940 |
| 2,208,091 | Zakarias | July 16, 1940 |
| 2,212,839 | Lett | Aug. 27, 1940 |
| 2,241,569 | Zakarias | May 13, 1941 |
| 2,343,263 | Okrent | Mar. 7, 1944 |
| 2,409,644 | Samuel | Oct. 22, 1946 |